United States Patent
Carpenter

(10) Patent No.: US 12,214,972 B2
(45) Date of Patent: Feb. 4, 2025

(54) SYSTEM AND METHOD FOR PARCEL SLUG ACCUMULATION AND REDISTRIBUTION

(71) Applicant: Körber Supply Chain LLC, DFW Airport, TX (US)

(72) Inventor: Michael D. Carpenter, Arlington, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 213 days.

(21) Appl. No.: 17/933,962

(22) Filed: Sep. 21, 2022

(65) Prior Publication Data

US 2024/0092589 A1 Mar. 21, 2024

(51) Int. Cl.
*B65G 47/42* (2006.01)
*B65G 47/26* (2006.01)

(52) U.S. Cl.
CPC ........... *B65G 47/42* (2013.01); *B65G 47/261* (2013.01); *B65G 2201/0285* (2013.01); *B65G 2203/0233* (2013.01); *B65G 2203/0241* (2013.01)

(58) Field of Classification Search
None
See application file for complete search history.

(56) References Cited

U.S. PATENT DOCUMENTS 6,259,967 B1 * 7/2001 Hartlepp ............ B65G 47/1492
198/444
7,063,206 B2 * 6/2006 Haan ...................... B65G 43/10
198/460.3

* cited by examiner

*Primary Examiner* — William R Harp
(74) *Attorney, Agent, or Firm* — Price Heneveld LLP

(57) ABSTRACT

Embodiments include a parcel processing system and methods for operating the same. The parcel processing system includes a collector configured to receive a flow of parcels and a slug accumulation system configured to receive the flow of parcels and produce a normalized bulk flow of parcels. The parcel processing system also includes a bulk transport conveyor configured to receive the normalized bulk flow of parcels and a singulator configured to receive the normalized bulk flow of parcels from the bulk transport conveyor. The normalized bulk flow of parcels is a flow of parcels having an approximately constant parcel density traveling at a fixed speed.

13 Claims, 9 Drawing Sheets

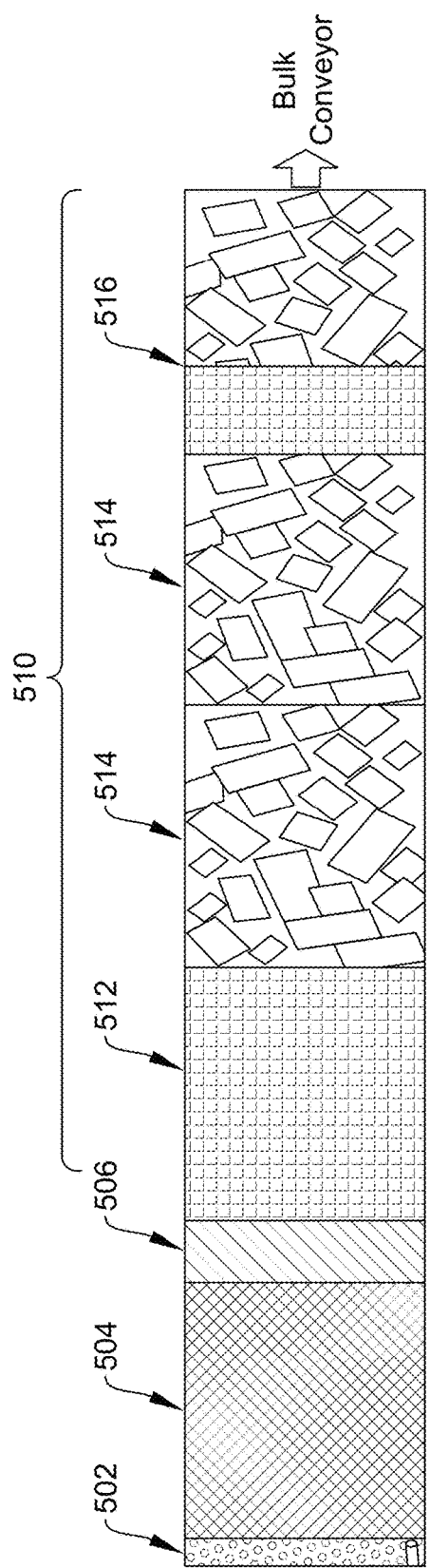
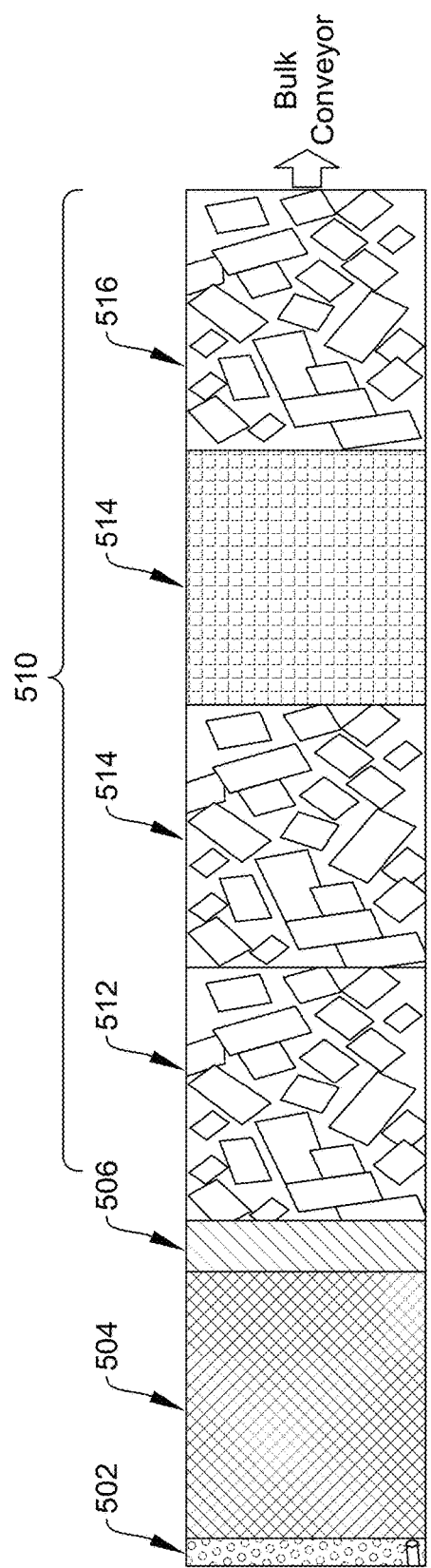
FIG. 5C
FIG. 5D

SYSTEM AND METHOD FOR PARCEL SLUG ACCUMULATION AND REDISTRIBUTION

BACKGROUND

Aspects of the present invention generally relate to a parcel management and transportation system and a method.

At various stages of parcel processing, the incoming stream of parcels must be, at various times, processed in a "bulk" stream and processed in a singulated stream. Improved systems for more efficient singulation using slug accumulation and redistribution are provided.

SUMMARY

Various disclosed embodiments include parcel processing systems and related processes and computer-readable mediums. The parcel processing system includes a slug accumulation system, a bulk conveyor, a singulator, and a control system to operate one or more of the slug accumulation system, the bulk conveyor, and the singulator.

One embodiment includes a parcel processing system having a collector configured to receive a flow of parcels and a slug accumulation system configured to receive the flow of parcels and produce a normalized bulk flow of parcels. The parcel processing system also includes a bulk transport conveyor configured to receive the normalized bulk flow of parcels and a singulator configured to receive the normalized bulk flow of parcels from the bulk transport conveyor. The normalized bulk flow of parcels is a flow of parcels having an approximately constant parcel density traveling at a fixed speed.

Another embodiment includes a slug accumulation system having an accumulator configured to receive a flow of parcels and accumulate a slug of parcels and an accumulator discharge conveyor configured to discharge the slug of parcels onto a slug conveyor based at least in part on a determination that the slug of parcels has been accumulated on the accumulator. The slug conveyor being configured to provide a normalized bulk flow of parcels to a bulk transport conveyor, wherein the normalized bulk flow of parcels is a flow of parcels having an approximately constant parcel density traveling at a fixed speed.

A further embodiments includes a parcel processing method. The method includes receiving a flow of parcels and accumulating a slug of parcels from the flow of parcels. The method also includes transferring the slug of parcels onto a slug conveyor configured to produce a normalized bulk flow of parcels and providing, by the slug conveyor, the normalized bulk flow of parcels onto a bulk transport conveyor. The normalized bulk flow of parcels is a flow of parcels having an approximately constant parcel density traveling at a fixed speed.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5C illustrates another example of a top view of a slug accumulation system in accordance with disclosed embodiments;

FIG. 5D illustrates another example of a top view of a slug accumulation system in accordance with disclosed embodiments;

DETAILED DESCRIPTION

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In parcel processing operations, a processing facility performs the consolidation and fragmentation of bulk volumes of parcels. Within this process, consolidation represents aggregating an amalgam of parcels with a plurality of destinations, typically for the purpose of shipping/transfer between processing facilities within a shipping network, while fragmentation represents sorting the parcels per common destinations within the network, such as for sorting to downstream facilities within the network and/or to final delivery points.

Figure 1:
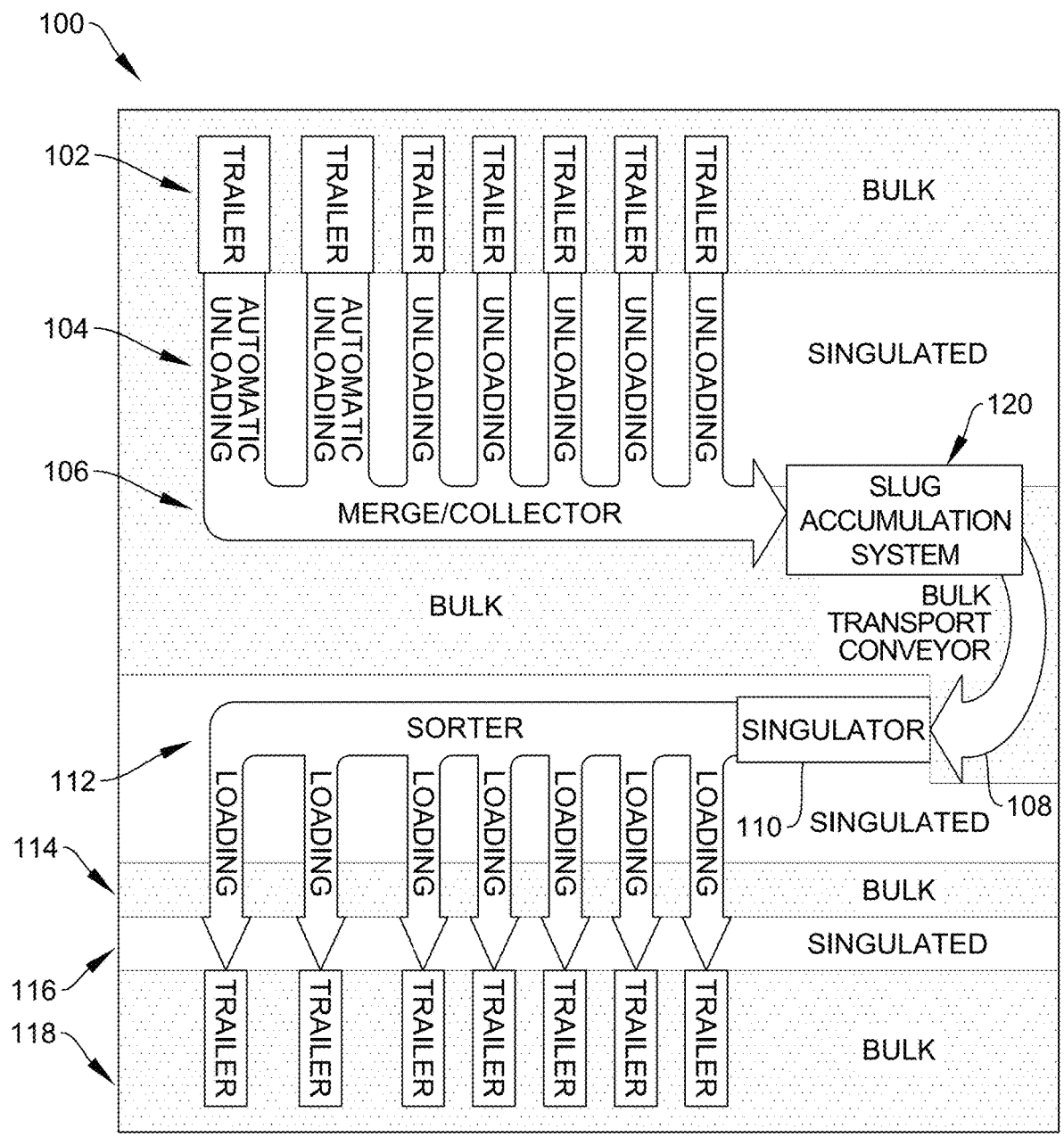
FIG. 1 illustrates a parcel processing system in accordance with disclosed embodiments.

FIG. 1 illustrates a parcel processing system 100 in accordance with an embodiment. In general, parcel processing system 100 operates by the parcels being unloaded and merged into an essentially consolidated flow, then fragmented by parcel sorting to parcel loading into individual trailers with specific destinations.

In this example, parcels are transported or stored in bulk in container/trailer 102. During unloading 104, whether manual or automatic, the parcels are largely singulated. The singulated parcel flows from each container are provided to a collector 106, which produces a merged flow. The merged flow is then provided to a slug accumulation system 120, which normalizes the density of the merged flow and produces a normalized bulk flow. The normalized bulk flow is then transported on bulk transport conveyor 108. In exemplary embodiments, the normalized bulk flow of parcels is a flow of parcels that have an approximately constant parcel density traveling at a fixed speed. The normalized bulk flow from the slug accumulation system 120 is singulated again at singulator 110 for sorting 112. After sorting, the sorted parcels are again in a bulk collection at sorting output 114 (and any related transport). The process of loading the sorted bulk parcels at 116 again largely singulates them, where they are collected in bulk in container/trailer 118.

In reality, a process as reflected in the example of FIG. 1 is very complex; there may be single parcel sources that do not require merging with other sources to provide adequate provisioning volume for the singulator, there may be multiple sorting steps and the process may involve loading for delivery, but this simplified perspective faithfully illustrates factors affecting the problem. Within the overall process, the parcels remain commingled in a bulk state whenever possible. This improves efficiency but has the effect of requiring singulation from bulk flow when the parcels must be handled individually, as in the unloading, sorting, and loading steps.

Ideally, the processing rates of input (unloading), sorting (including input singulation), and loading are balanced so that across the overall process, each step would run at a steady, optimal rate. This allows staffing from end to end to be optimized in terms of productivity. In reality, however, all elements of the overall process are highly dynamic and affected by different factors so that variations in processing rate are seldom synchronized. Further, certain elements are highly sensitive to over-provisioning (exceeding the dynamic rate limitation), which reduces productivity.

Figure 2:
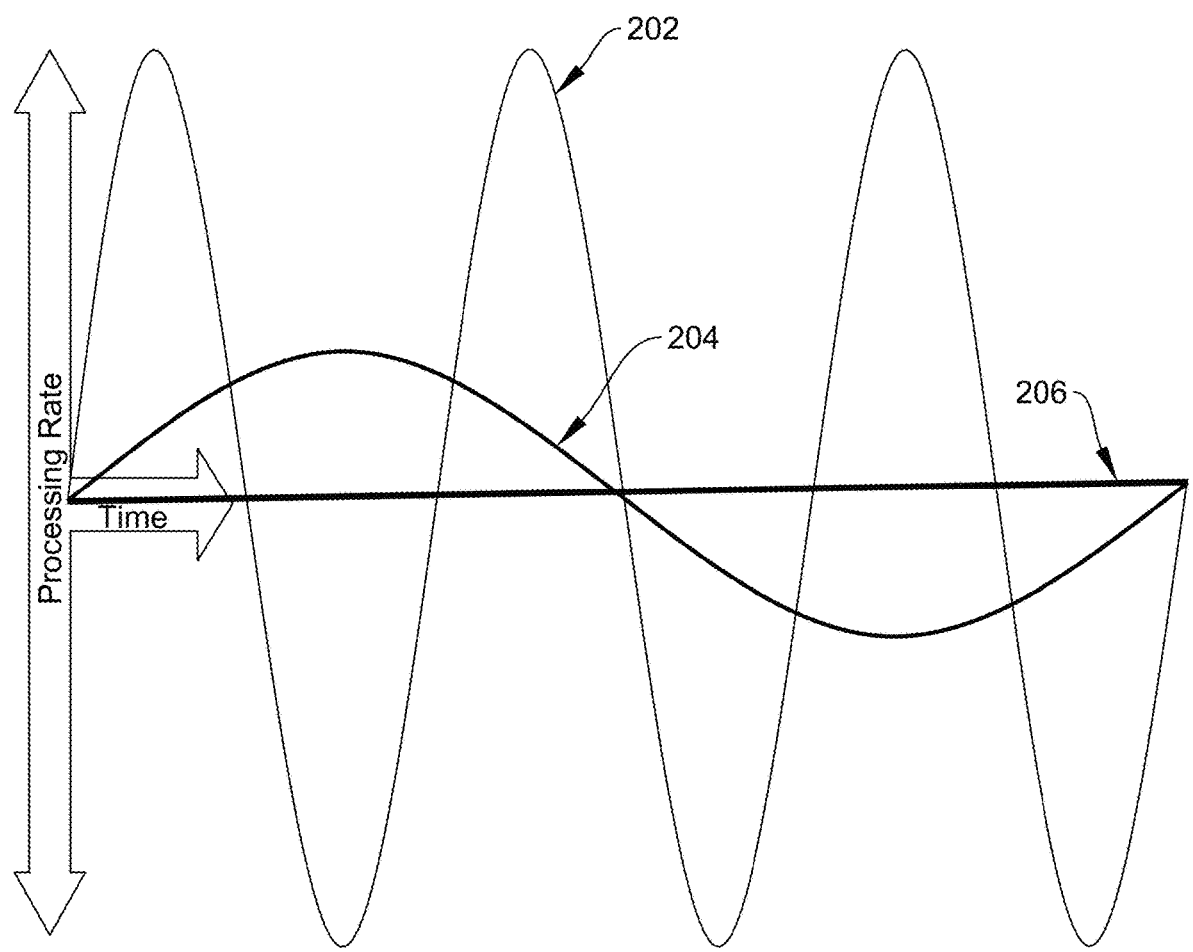
FIG. 2 illustrates the influence of variability of provisioning on the productivity of a sorting process.

FIG. 2 illustrates the inherent, dynamic variability between provisioning and processing in a typical parcel singulator. Even if the average provisioning rate and average processing rate are essentially the same 206, both provisioning and processing are highly variable, as illustrated in the dynamic rate of provision 202 and the dynamic processing rate limitation 204. While, in this example, symmetrical sine waves for the dynamic phases of provision 202 and the dynamic processing rate limitation 204 are shown to explain the principal, the fluctuations in provisioning are unpredictable within the constraints of the flow capacity of a typical bulk transport conveyor. Similarly, the processing rate limitation is unpredictable within fundamental constraints.

Figure 3:
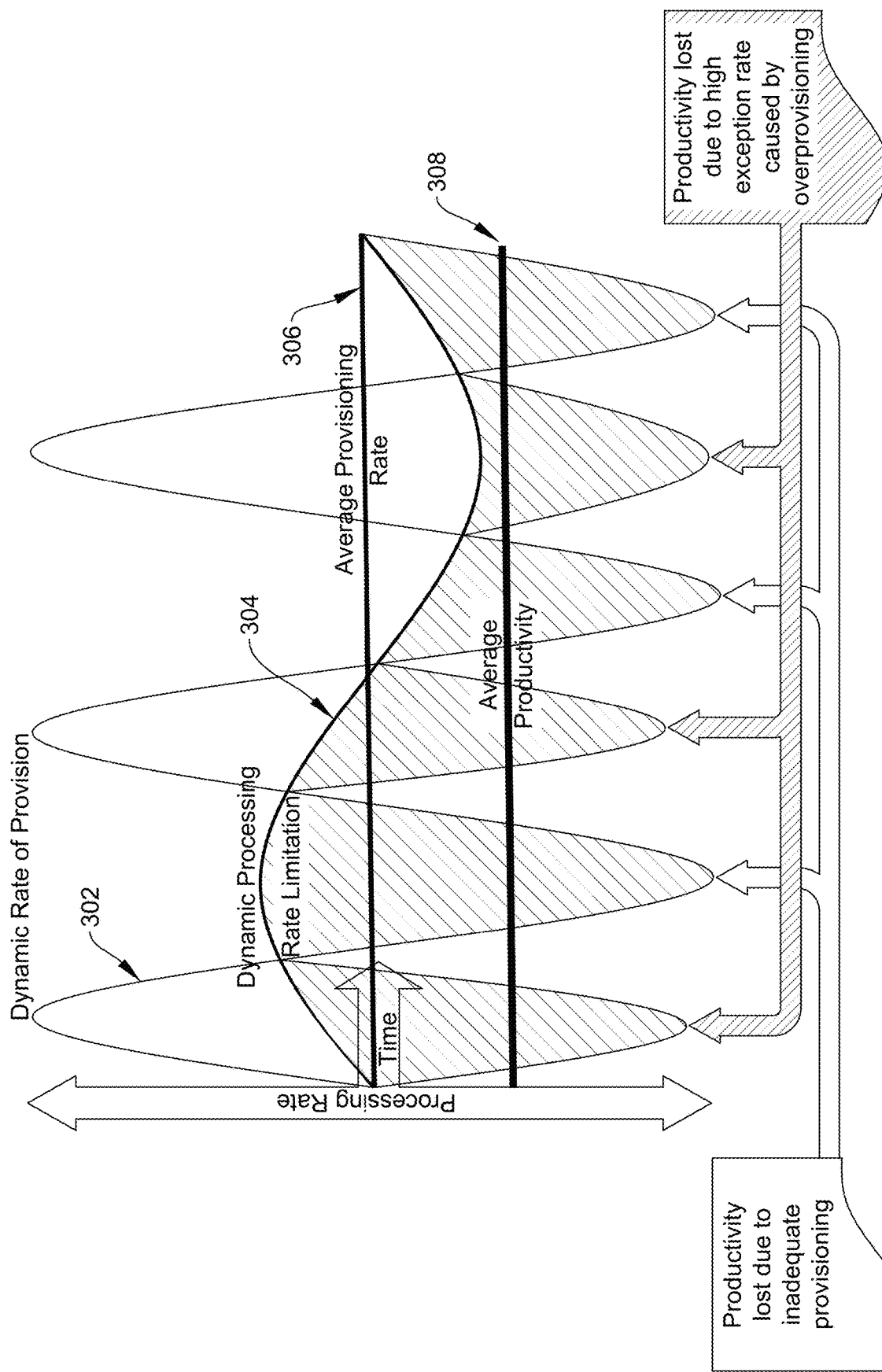
FIG. 3 illustrates the benefit of an inline accumulation function in satisfying the dynamic processing rate limitation, resulting in improved productivity.

FIG. 3 illustrates the effect of mismatching rates between the dynamic rate of provision 302 and the dynamic processing rate limitation 304. When the dynamic phases of provision for a singulator 302 exceed the dynamic processing rate limitation of the singulator 304, the rate at which singulation exceptions occur tends to rise significantly, resulting in non-productive processing. Furthermore, when the dynamic phases of provision for a singulator 302 fall short of the dynamic processing rate limitation of the singulator 304, the singulator is starved, and singulation productivity suffers accordingly. Both over- and under-provisioning have the effect of reducing productivity, which results in the failure of related systems to capture planned value.

Disclosed embodiments provide systems and methods for improving control of the parcel processing system using a slug accumulation system to normalize the flow of parcels on the bulk transport conveyor. Disclosed embodiments provide a slug accumulation system that maintains a normalized density on the conveyor directly upstream of the singulator, and therefore makes the parcel processing not only predictable, but optimal. Disclosed embodiments normalize the otherwise dynamic rate of provision of parcels onto the bulk transport conveyor to conform to the processing rate limitation of the singulator.

Figure 4:
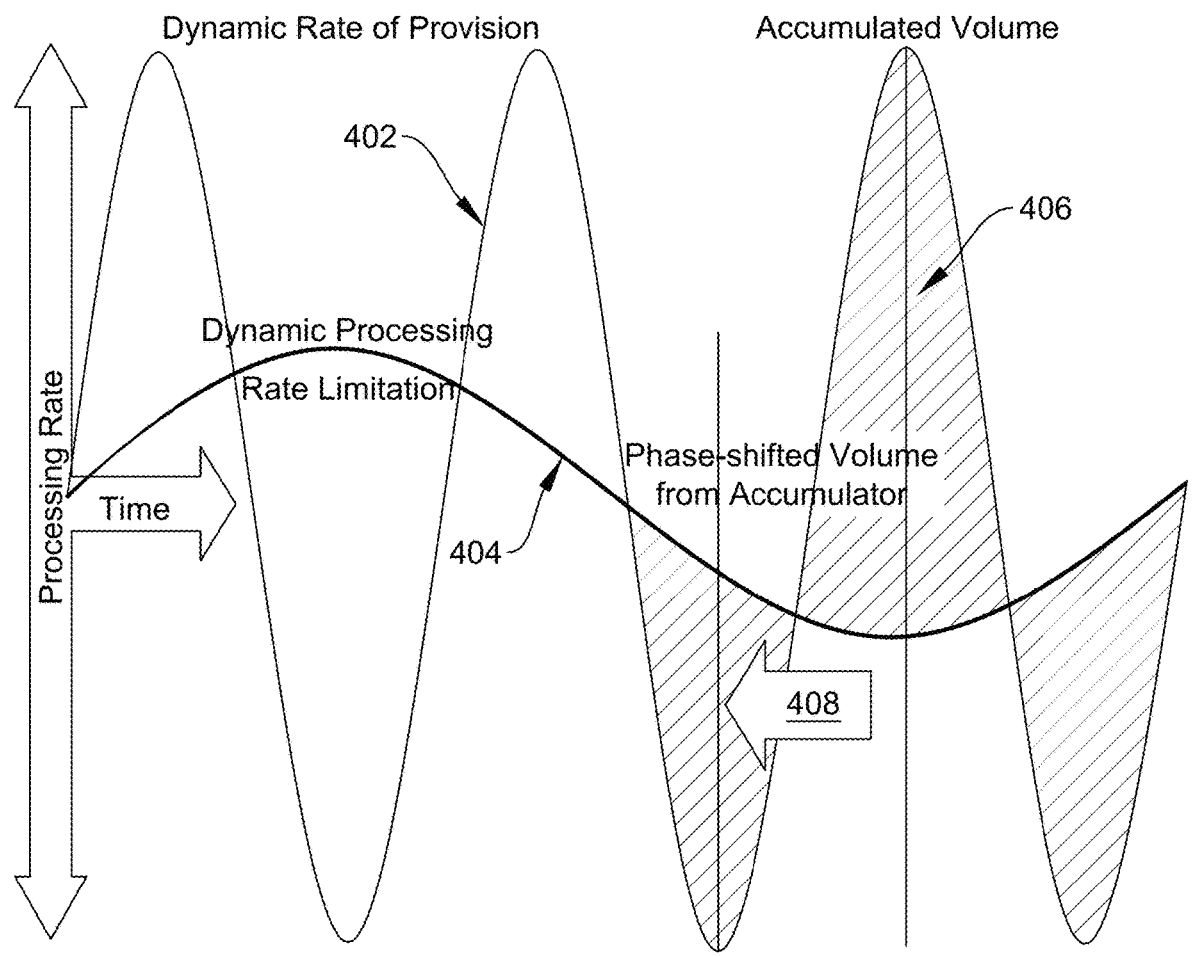
FIG. 4 illustrates a function of the inline accumulator at the input of the singulator in accordance with disclosed embodiments.

FIG. 4 illustrates a function of an accumulator at the input of a singulator. In this figure, the original dynamic rate of provision 402 again occasionally exceeds or is less than the dynamic processing rate limitation 404. However, as shown on the right side of this figure, disclosed embodiments accomplish a phase-shifting of the provisioning from the accumulator, so that instances in which parcel volume 406 that would have exceeded the dynamic processing rate limitation 404 are instead accumulated and later discharged when capacity 408 to accommodate them exists, represented as subsequent periods of time 408 during which dynamic processing rate limitation 404 exceeds the dynamic rate of provision 402.

Figure 5A:
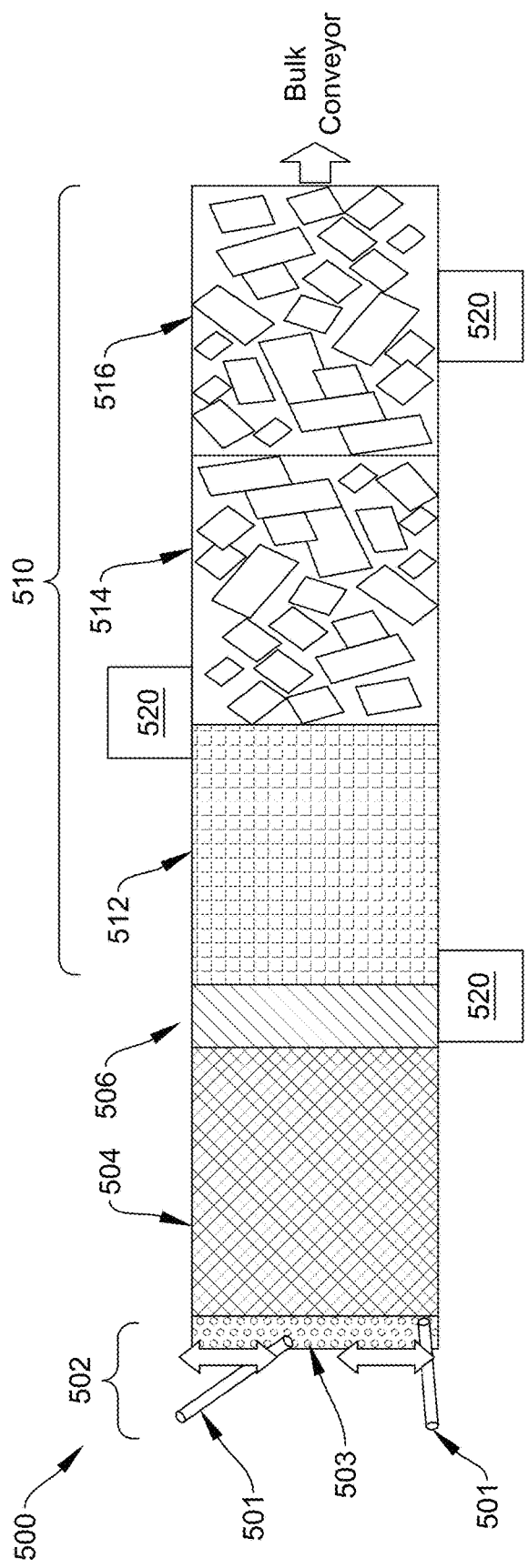
FIGS. 5A and 5B illustrate an example of a top view and a side view of a slug accumulation system in accordance with disclosed embodiments.
Figure 5B:
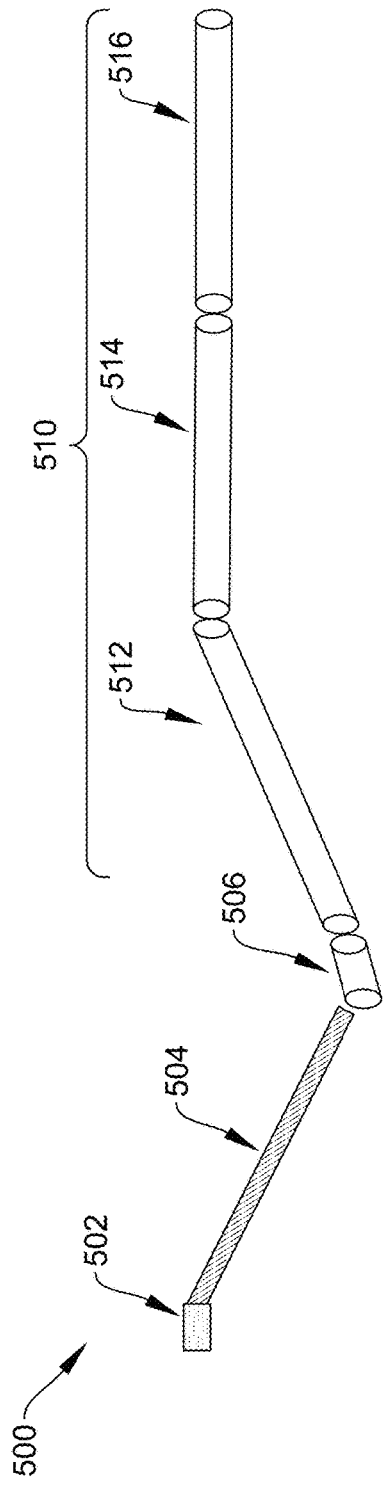

Referring now to FIGS. 5A and 5B, a top and side view of a slug accumulation system 500 in accordance with an embodiment are shown. As illustrated, the slug accumulation system 500 includes a spreader 502, an accumulator 504, an accumulator discharge conveyor 506, and a slug conveyor 510. In exemplary embodiments, the slug conveyor 510 includes multiple separate conveyors, which include an intake conveyor 512, one or more intermediate conveyors 514, and an output conveyor 516.

In exemplary embodiments, the spreader 502 is configured to receive a bulk flow of parcels from the collector 106, as shown in FIG. 1, and to spread the parcels along the width of the accumulator 504. In one embodiment, the spreader 502 includes one or more distribution arms 501 that are configured to distribute the parcels across the width of the accumulator 504. In another embodiment, the spreader 502 includes one or more pivoting wheels 503 (powered or free-turning) that are configured to distribute the parcels across the width of the accumulator 504. In some embodiments, spreading may be guided by vision systems, or be simple reciprocating actions.

In exemplary embodiments, the accumulator 504 of the slug accumulation system is implemented using an inclined gravity conveyor. In one embodiment, the accumulator 504 includes a plurality of modular plastic conveyor units with free-running roller features distributed across the transport surface. In some embodiments, the orientation of the roller features about the longitudinal axis may be angled to change the steering of items being conveyed. An embodiment of such modular plastic conveyor units is described in more detail with reference to FIG. 6.

In exemplary embodiments, the accumulator 504 is configured to create slugs, or dense, fixed size structures of parcels. These slugs are intermittently processed contiguously and at relatively high speed. When the accumulator 504 has accumulated a threshold amount of spread items, the accumulator discharge conveyor 506 at the base of the accumulator 504 operates to draw a slug of fixed length from the accumulator 504 and drive it onto the intake conveyor 512. In exemplary embodiments, various techniques may be used to measure the length of the slug, which cannot exceed the capacity of the intake conveyor 512, these techniques include but are not limited to the use of photo eyes or belt distance encoders.

As illustrated, the slug conveyor 510 includes conveyors, each of which are separately controllable. In exemplary embodiments, the intake conveyor 512 is configured to receive, at a relatively high rate of speed, a slug of items/parcels from the accumulator discharge conveyor 506. In exemplary embodiments, the output conveyor 516 is configured to feed the bulk conveyor, shown as 108 in FIG. 1, which in turn feeds the downstream singulator, shown as 110 in FIG. 1. In exemplary embodiments, the bulk conveyor operates at a significantly slower, essentially continuous speed. As a result, the output conveyor 516 is configured to operate at different speeds, one relatively slow, continuous speed, when discharging a slug into the bulk conveyor, and a second, relatively high intermittent speed, when receiving a slug being passed from the immediately upstream intermediate conveyor 514. In exemplary embodiments, output conveyor 516 alternates between the relatively slow, continuous downstream conveyor operation when discharging and the relatively high, intermittent operation when receiving.

In exemplary embodiments, the slug accumulation system 500 includes a plurality of sensors 520 that are disposed throughout the slug accumulation system 500 to monitor the position of the parcels. Based on the input from these sensors, slugs of parcels are moved between the various conveyors of the slug conveyor 510. In exemplary embodiments, the sensors 520 may be look-across photocells, LIDAR, machine vision camera, or other sensor that is configured to detect parcels. The slug accumulation system 500 can include multiple other sensors 520 or other sensors to detect a "fill state" of accumulated parcels at various points in the slug accumulation system 500.

Figure 8:
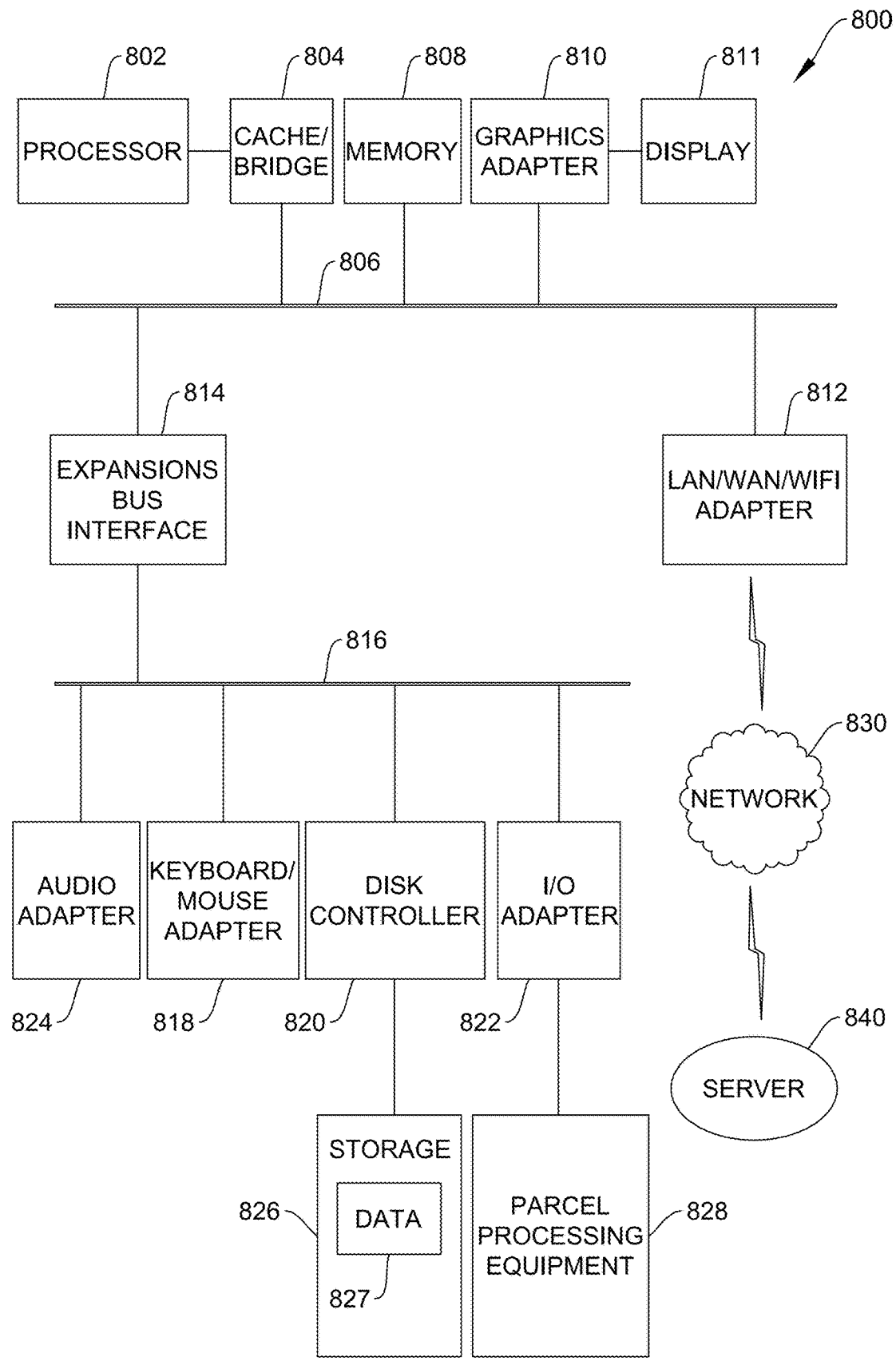
FIG. 8 illustrates a block diagram of a data processing system with which an embodiment can be implemented, for example as a control system in accordance with disclosed embodiments.

In exemplary embodiments, the operational mode, idle or moving, and the operating speed of each of the accumulator discharge conveyor 506, the intake conveyor 512, the one or more intermediate conveyors 514 and the output conveyor 516 are independently controlled by a processing system, such as the one shown in FIG. 8. In one embodiment, the same processing system may also be used to control the other components of the parcel processing system.

In exemplary embodiments, the number of intermediate conveyors 514 in the slug conveyor 510 is at least one and can vary based on the applications. In exemplary embodiments, the length of each of the intake conveyor 512, one or more intermediate conveyors 514, and an output conveyor 516 are approximately equal and the length of the accumulator 504 is at least the length of the intake conveyor 512, the one or more intermediate conveyors 514, and the output conveyor 516.

As best shown in FIG. 5B, the accumulator 504 is configured to be positioned at a declined angle so that the parcels/items placed on the accumulator 504 will be gravity fed towards the accumulator discharge conveyor 506. In one embodiment, the decline angle of the accumulator 504 is approximately eight to ten degrees. In exemplary embodiments, the decline angle of the accumulator 504 may be determined based on the weight and size of the items/parcels in the system.

Referring now to FIGS. 5C and 5D, another example of a slug accumulation system in accordance with an embodiment is shown. As illustrated, the slug conveyor 510 includes two intermediate conveyors 514 in addition to the intake conveyor 512 and the output conveyor 516. In the configuration shown, the intake conveyor 512 is empty and awaiting a slug of parcels to be moved from the accumulator 504 by the accumulator discharge conveyor 506. As best shown in FIG. 5C, the output conveyor 516 includes a slug that is being discharged onto the bulk conveyor. As described above, the output conveyor 516 operates at a relatively slow, continuous speed, when discharging a slug into the bulk conveyor. Once the slug has been fully discharged onto the bulk conveyor, the output conveyor 516 and the immediately upstream intermediate conveyors 514 both operate at a relatively high intermittent speed, to pass a slug from the immediately upstream intermediate conveyors 514 to the output conveyor 516, as bests shown in FIG. 5D. This process is then repeated upstream towards the intake conveyor 512. In exemplary embodiments, the number of intermediate conveyors 514 can be varied across implementations based on the expected variance in parcel arrival rate at the slug accumulation system.

Figure 6:
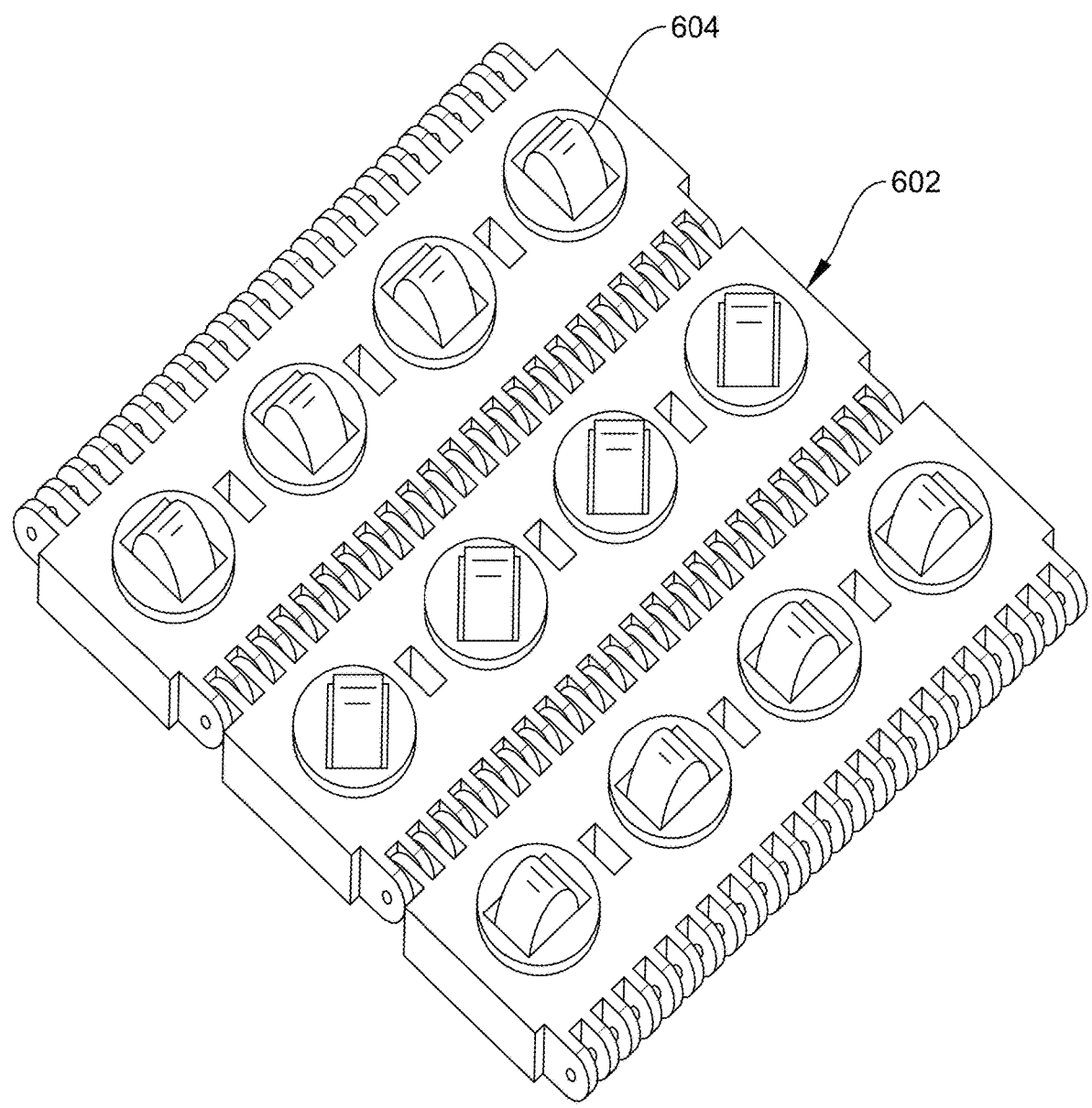
FIG. 6 illustrates an example of a modular conveyor unit in accordance with disclosed embodiments.

Referring now to FIG. 6, an example of a modular conveyor unit 602 with a plurality of wheels 604, which can be driven or free-rolling, is shown. Wheels 604 can be controlled to present different angles of travel. In various embodiments, a conveying surface is comprised of one or more modular conveyor units 602, and each modular conveyor unit 602 is stationary, establishing a plane installed at an angle so that articles roll "downhill" on the surfaces of the individual rollers. Traditional gravity conveyors rely on free-turning rollers extending across a conveyor installed at an incline. One advantage of a modular conveyor unit 602 is that the rolling surface across the conveyor is composed of independent rolling elements, which allows adjacent items across the conveyor to move freely, whereas a stationary item on a longer roller would hold the roller and any other items coming into contact with that roller stationary.

Figure 7:
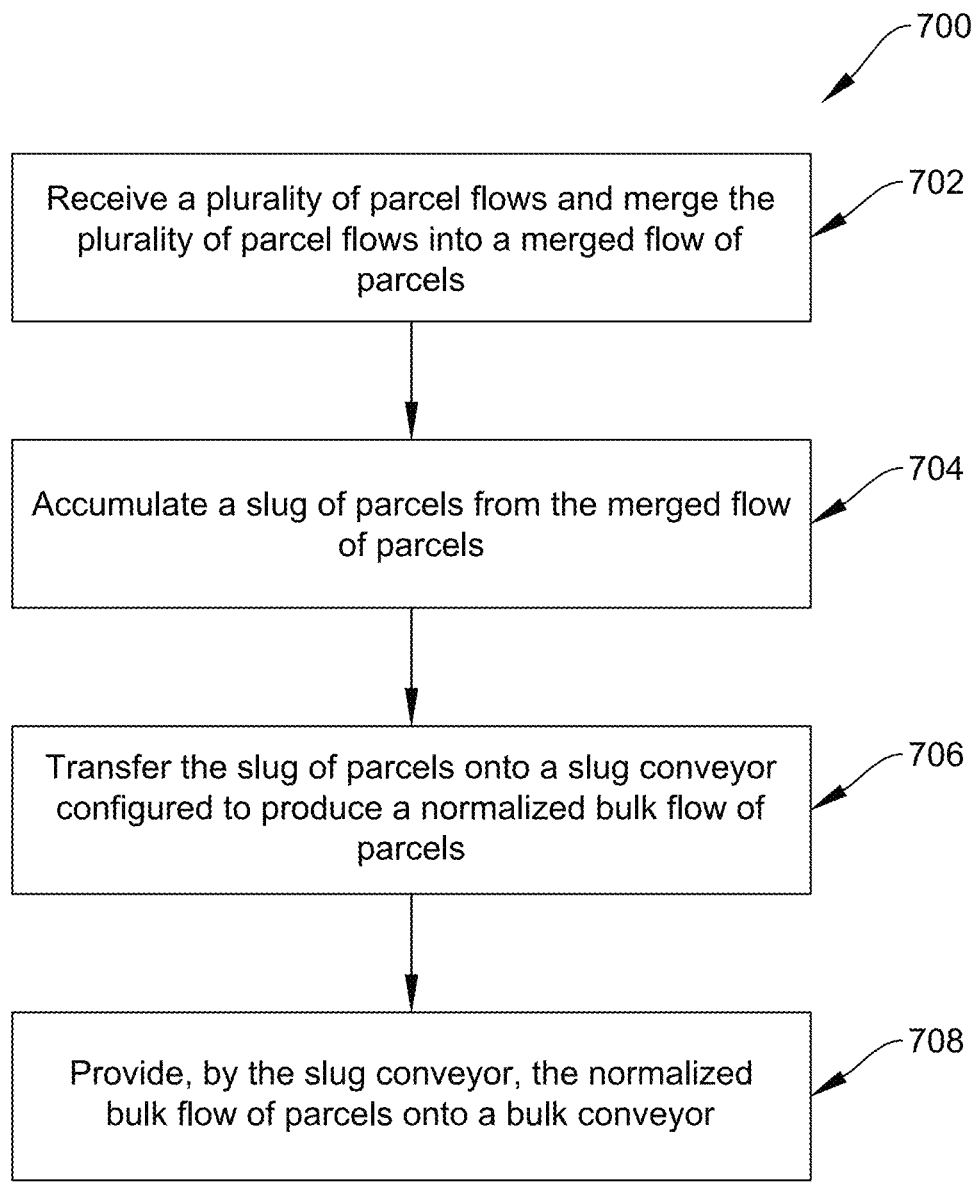
FIG. 7 illustrates a flowchart of a process in accordance with disclosed embodiments.

FIG. 7 illustrates a flowchart of a method 700 in accordance with disclosed embodiments, as performed under the control of a control system of a parcel processing system including a bulk conveyor, a slug accumulation system, and a singulator. As shown at block 702, the method 700 includes receiving a plurality of parcel flows and merging the plurality of parcel flows into a merged flow of parcels. Next, as shown at block 704, the method 700 includes accumulating a slug of parcels from the merged flow of parcels. In exemplary embodiments, accumulating the slug of parcels includes spreading the merged flow of parcels across a width of an accumulator. As used herein, a slug of parcels is a group of parcels having a desired parcel density and a minimum length.

Once a slug of parcels has been accumulated, the method 700 includes transferring the slug of parcels onto a slug conveyor configured to produce a normalized bulk flow of parcels, as shown at block 706. In various embodiments, the determination of whether a slug has been accumulated on the accumulator can be performed by monitoring a fill sensor that determines the fill state of the accumulator, such as using a look-across photocell, LIDAR, machine vision camera, or other sensor. The fill state can indicate that that accumulator includes at least a minimum number of parcels and/or that the parcels on the accumulator have met a pre-determined capacity level of the accumulator. The parcel processing system can operate an accumulator discharge conveyor to move the slug of parcels from the accumulator onto the slug conveyor.

Next, as shown at block 708, the method 700 includes providing, by the slug conveyor, the normalized bulk flow of parcels onto a bulk transport conveyor. In exemplary embodiments, the normalized bulk flow of parcels is a flow of parcels having an approximately constant parcel density traveling at a fixed speed. In exemplary embodiments, the slug conveyor includes an output conveyor that is configured to operate at a first speed while providing the normalized bulk flow of parcels to the bulk transport conveyor and to operate at a second speed that is greater than the first speed when receiving the slug of parcels from an intermediate conveyor.

In exemplary embodiments, the slug conveyor includes an input conveyor configured to receive the slug of parcels from the accumulator, one or more intermediate conveyors configured to receive the slug of parcels from either the input conveyor or an upstream intermediate conveyor, and an output conveyor configured to receive the slug of parcels from the last intermediate conveyor and to provide the slug of parcels to the bulk conveyor at an approximately constant speed.

FIG. 8 illustrates a block diagram of a data processing system 800 with which an embodiment can be implemented, for example as a control system or other device configured by software or otherwise to perform the processes as described herein, and in particular as each one of a plurality of interconnected and communicating systems as described herein. The exemplary, non-limiting data processing system 800 can be used, for example, as the control system of the parcel processing system and for controlling one or more of the transport, singulation, sorting, and other devices. The data processing system depicted includes a processor 802 connected to a level two cache/bridge 804, which is connected in turn to a local system bus 806. Local system bus 806 may be, for example, a peripheral component interconnect (PCI) architecture bus. Also connected to local system bus in the depicted example are a main memory 808 and a graphics adapter 810. The graphics adapter 810 may be connected to display 811.

Other peripherals, such as local area network (LAN)/Wide Area Network/Wireless (e.g. WiFi) adapter 812, may also be connected to local system bus 806. Expansion bus interface 814 connects local system bus 806 to input/output (LO) bus 816. LO bus 816 is connected to keyboard/mouse adapter 818, disk controller 820, and LO adapter 822. Disk controller 820 can be connected to a storage 826, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 826 can store any data 827 useful in performing processes as described herein, including any executable instructions, statuses, signal input data, configuration data, sort data, processing rate data, or other data.

I/O adapter 822 is connected to control parcel processing equipment 828, which can be any of the elements illustrated in FIGS. 1 and 5A-5D. Also connected to LO bus 816 in the example shown is audio adapter 824, to which speakers (not shown) may be connected for playing sounds. Keyboard/mouse adapter 818 provides a connection for a pointing device (not shown), such as a mouse, trackball, trackpointer, touchscreen, etc.

Those of ordinary skill in the art will appreciate that the hardware depicted in FIG. 8 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

LAN/WAN/Wireless adapter 812 can be connected to a network 830 (not a part of data processing system 800), which can be any public or private data processing system network or combination of networks, as known to those of skill in the art, including the Internet. Data processing system 800 can communicate over network 830 with server system 840, which is also not part of data processing system 800, but can be implemented, for example, as a separate data processing system 800. Data processing system 800 can communicate with other elements as disclosed herein, such as communications between the control system and each of the parcel processing devices or systems, communications with users, and other communications, whether wired or wireless.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

Note that portions of the overall control system of the parcel processing system need not be controlled by a central processor or controller but can be implemented using discrete circuits. For example, the stop/run operation of one stage of the multi-stage bulk transport accumulator could be directly circuit-controlled based on sensor inputs from the downstream stage.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, the features and operations of various examples described herein and in the incorporated applications can be combined in any number of implementations.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

As used herein the terms "include" and "comprise," as well as derivatives thereof, mean inclusion without limitation: the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

What is claimed is:

1. A parcel processing system comprising:
    a collector configured to receive a flow of parcels;
    a slug accumulation system configured to receive the flow of parcels and produce a normalized bulk flow of parcels;
    a bulk transport conveyor configured to receive the normalized bulk flow of parcels;
    a singulator configured to receive the normalized bulk flow of parcels from the bulk transport conveyor; and
    an accumulator configured to receive the flow of parcels and accumulate a slug of parcels;
    wherein the normalized bulk flow of parcels is a flow of parcels having an approximately constant parcel density traveling at a fixed speed; and
    wherein the slug accumulation system further comprises a spreader configured to distribute the flow of parcels across a width of the accumulator.

2. The parcel processing system of claim 1, wherein the slug accumulation system comprises:
    an accumulator discharge conveyor configured to discharge the slug of parcels onto a slug conveyor based at least in part on a determination that the slug of parcels has been accumulated on the accumulator,
    wherein the slug conveyor is configured to provide the normalized bulk flow of parcels to the bulk transport conveyor.

3. The parcel processing system of claim 2, wherein the accumulator discharge conveyor comprises:
    an intake conveyor configured to receive the slug of parcels from the accumulator discharge conveyor and to provide the slug of parcels to an intermediate conveyor; and
    an output conveyor configured to receive the slug of parcels from the intermediate conveyor and to provide the normalized bulk flow of parcels to the bulk transport conveyor.

4. The parcel processing system of claim 3, wherein the output conveyor is configured to operate at a first speed while providing the normalized bulk flow of parcels to the bulk transport conveyor and to operate at a second speed that is greater than the first speed when receiving the slug of parcels from the intermediate conveyor.

5. The parcel processing system of claim 2, wherein the slug accumulation system further comprises a plurality of sensors configured to monitor at least one of an accumulation of parcels on the accumulator and a location of parcels on the slug conveyor.

6. The parcel processing system of claim 5, further comprising a processing system configured to control an operation of the accumulator discharge conveyor and the slug conveyor based at least in part on data received from the plurality of sensors.

7. A slug accumulation system, comprising:
    an accumulator configured to receive a flow of parcels and accumulate a slug of parcels; and
    an accumulator discharge conveyor configured to discharge the slug of parcels onto a slug conveyor based at least in part on a determination that the slug of parcels has been accumulated on the accumulator;
    wherein the slug conveyor is configured to provide a normalized bulk flow of parcels to a bulk transport conveyor; and
    wherein the normalized bulk flow of parcels is a flow of parcels having an approximately constant parcel density traveling at a fixed speed; and
    a spreader configured to distribute the flow of parcels across a width of the accumulator.

8. A slug accumulation system comprising:
    an accumulator configured to receive a flow of parcels and accumulate a slug of parcels; and
    an accumulator discharge conveyor configured to discharge the slug of parcels onto a slug conveyor based at least in part on a determination that the slug of parcels has been accumulated on the accumulator;
    wherein the slug conveyor is configured to provide a normalized bulk flow of parcels to a bulk transport conveyor; and
    wherein the normalized bulk flow of parcels is a flow of parcels having an approximately constant parcel density traveling at a fixed speed;
    wherein the accumulator discharge conveyor comprises:
        an intake conveyor configured to receive the slug of parcels from the accumulator discharge conveyor and to provide the slug of parcels to an intermediate conveyor; and
        an output conveyor configured to receive the slug of parcels from the intermediate conveyor and to provide the normalized bulk flow of parcels to the bulk transport conveyor; and
    wherein the output conveyor is configured to operate at a first speed while providing the normalized bulk flow of parcels to the bulk transport conveyor and to operate at a second speed that is greater than the first speed when receiving the slug of parcels from the intermediate conveyor.

9. The slug accumulation system of claim 7, further comprising a plurality of sensors configured to monitor at least one of an accumulation of parcels on the accumulator and a location of parcels on the slug conveyor.

10. The slug accumulation system of claim 9, further comprising a processing system configured to control an operation of the accumulator discharge conveyor and the slug conveyor based at least in part on data received from the plurality of sensors.

11. A parcel processing method, comprising:
    receiving a flow of parcels;
    accumulating a slug of parcels from the flow of parcels;

transferring the slug of parcels onto a slug conveyor configured to produce a normalized bulk flow of parcels; and providing, by the slug conveyor, the normalized bulk flow of parcels onto a bulk transport conveyor;

wherein the normalized bulk flow of parcels is a flow of parcels having an approximately constant parcel density traveling at a fixed speed; and wherein accumulating the slug of parcels further comprises spreading the flow of parcels across a width of an accumulator.

12. The parcel processing method of claim 11, wherein transferring the slug of parcels onto the slug conveyor is performed based at least in part on a determination that the slug of parcels has been accumulated on the accumulator.

13. The parcel processing method of claim 11, wherein the slug conveyor includes an output conveyor that is configured to operate at a first speed while providing the normalized bulk flow of parcels to the bulk transport conveyor and to operate at a second speed that is greater than the first speed when receiving the slug of parcels from an intermediate conveyor.

* * * * *